E. J. McCLELLAN.
CHUCK.
APPLICATION FILED JULY 9, 1917.
1,334,772.
Patented Mar. 23, 1920.
2 SHEETS—SHEET 1.
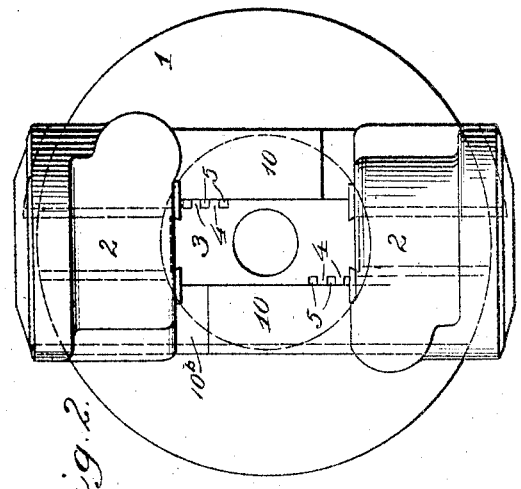
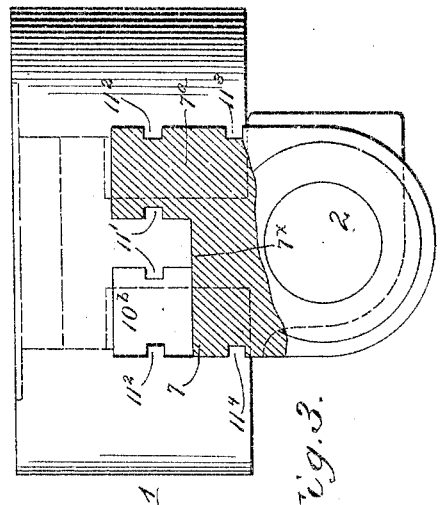
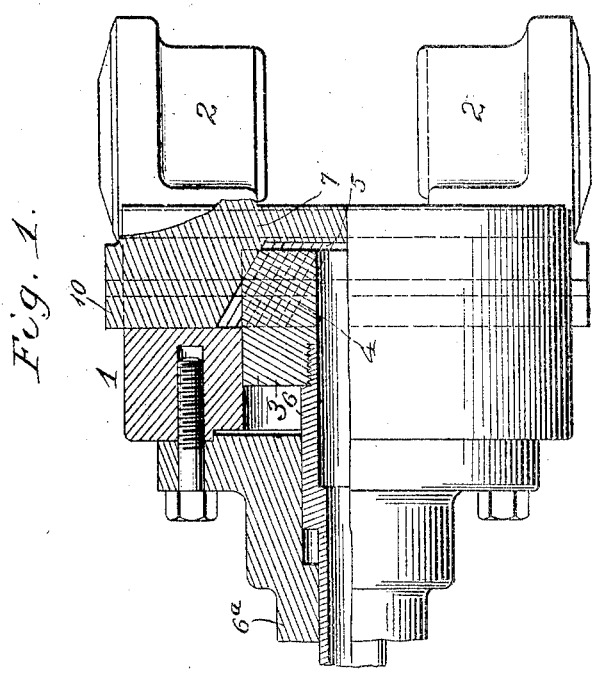
Inventor
E. J. McClellan
By his Attorneys
Rogers, Kennedy & Campbell E. J. McCLELLAN.
CHUCK.
APPLICATION FILED JULY 9, 1917.
1,334,772.
Patented Mar. 23, 1920.
2 SHEETS—SHEET 2.
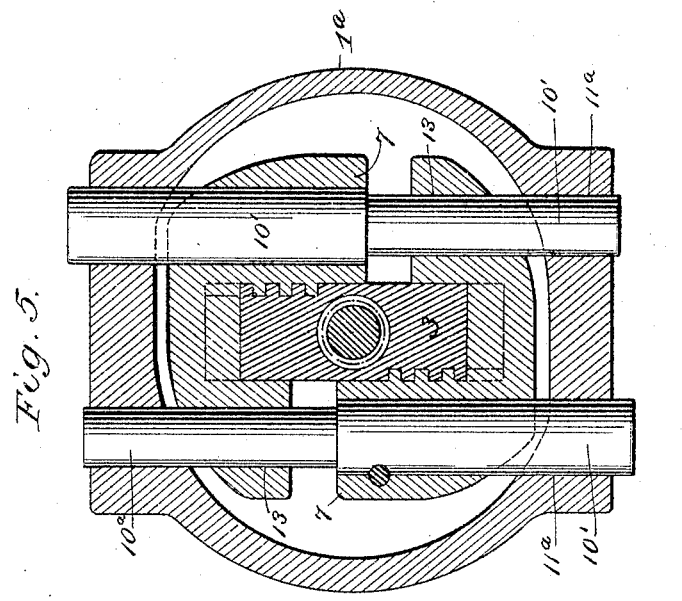
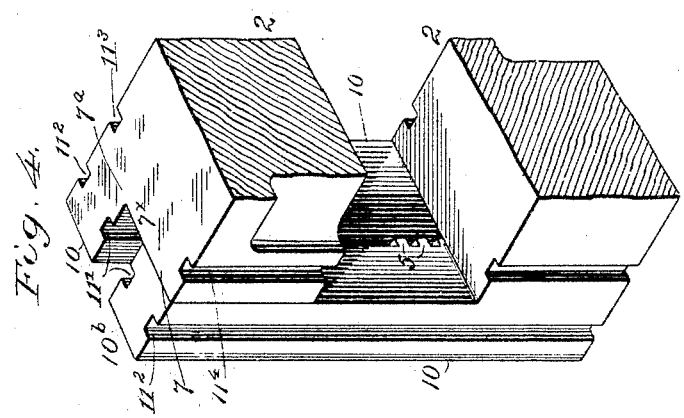
Inventor
E. J. McClellan
By his Attorney
Rogers, Kennedy & Campbell

UNITED STATES PATENT OFFICE.

EDWARD J. McCLELLAN, OF NEW YORK, N. Y., ASSIGNOR TO GARVIN MACHINE COMPANY, A CORPORATION OF NEW YORK.

CHUCK.

1,334,772.   Specification of Letters Patent.   Patented Mar. 23, 1920.

Original application filed July 30, 1914, Serial No. 854,042. Divided and this application filed July 9, 1917. Serial No. 179,395.

*To all whom it may concern:*

Be it known that I, EDWARD J. McCLELLAN, a citizen of the United States, residing at New York, in the county of New York and State of New York, have invented certain new and useful Improvements in Chucks, of which the following is a specification, reference being had therein to the accompanying drawing, this application being a division of original application filed July 30, 1914, Serial No. 854,042.

This invention relates to work gripping devices such as work holding jaws of chucks, vises, and like devices, the object of the invention being to produce a construction in which the work will be held with great rigidity and strength, and in which the jaws will resist, without liability of cramping or displacement or looseness of the work, the severe and powerful strains to which the work is subjected in practice when machining or other operations are performed thereon.

The invention is designed with special reference to the jaws of work holding chucks, although in its broader aspects it is not limited to such uses but is applicable as well to work holding jaws of other devices such as vises and the like; and the invention consists in an improved form and mounting for the jaws on their support or carrying part, by which the jaws will be given extended support, and in their movements to grip the work will be so guided and supported that they will be braced and sustained against displacement or spring, and will hold the work solidly and sturdily without danger of cramping or displacement.

In connection with the jaws of a chuck wherein the jaws in many cases possess considerable overhang, my improved construction is of special value and importance in resisting the tendency of the jaws to spring and cramp, which tendency is very marked in constructions of this type.

Also the invention is of special importance in a form of chuck in which provision is made for shifting the jaws to different relative positions to present different sides or faces of the work to machining, cutting, reaming, capping, and other operations, the rigidity with which the work is held in its different positions, enabling the operations to be performed with great accuracy and in an effective manner.

In the accompanying drawings:

Figure 1 is a side elevation, partly in section, of a chuck having my invention embodied therein;

Fig. 2 is a front elevation of the same;

Fig. 3 is a top plan view, with parts broken away to expose other parts to view;

Fig. 4 is a perspective view of the two jaws in operative assembled relations;

Fig. 5 is a cross-sectional elevation of a modified form of the invention.

Referring to Figs. 1 to 4, which represent my invention embodied in a chuck by way of example, 1 designates a support for the jaws in the form of a chuck casing in which the jaws 2 are mounted. The jaws are formed with extensions or bases 7 which are prolonged or carried in part entirely across the body of the chuck as at 10, nearly to the extent of the full diameter thereof. Under these conditions these jaw bases or extensions 7, prolonged at 10, lap past or clear one another, and their prolongations 10 are sufficiently offset laterally from one another to obtain this result. The position of these jaw bases or extensions and their prolongations is also such as to obtain additional functions hereafter pointed out. It will be understood that the jaws are alike and interchangeable, their different appearance in different views being merely due to the different positions they happen to assume relative to one another.

Referring to Fig. 3 the top or visible jaw is shown with its extension or base, here denoted $7^a$ extending downward, and prolonged in fact practically across the entire diameter of the chuck. The under or practically invisible jaw in Fig. 3 has its extension or base similarly prolonged clear across the whole diameter of the chuck, and appearing at $10^b$. It will be observed from Fig. 3 that each jaw extension or base, exemplified by $7^a$ of the upper jaw, has four guides, afforded by the tongues or ways $11'$, $11^2$, $11^3$ and $11^4$. This extension or base is, however, not guided by all four tongues or ways $11'$, $11^2$, $11^3$ and $11^4$ throughout the prolongation thereof. The prolongation 10 of the extension or base has only the guiding tongues or ways $11'$, $11^2$. This is due to the fact that each jaw extension or base will, in the best constructions, have a lateral part 7ˣ which projects adjacent to the prolongation (see 10ᵇ of Fig. 3) of the other jaw. This part 7ˣ will be guided on the tongues or ways 11³, 11⁴, which tongues or ribs at different portions of their lengths afford the third and fourth guides for the extension or base of the other jaw (the under jaw in Fig. 3) just as the upper jaw in this figure is actually shown to be guided. The lateral separation of the respective jaw prolongations is sufficient to receive a draw-block 3, having inclined ribs 4 thereon for engaging corresponding ribs 5 on the jaws to operate the same. The said draw-block is carried by a draw-tube 6 extending through a lathe spindle 6ᵃ connected with the chuck casing.

It will be observed that in accordance with the above, each jaw has what has been termed an extension, denoted 7, being really the rear part or base of the jaw itself, which is comparatively broad, in fact as broad as the jaw itself, and such extension runs in guides of the casing on both sides thereof, these guides being common to both jaws. In other words, the extension or base 7 of each jaw is guided on both sides by ways which are also a common guiding means for the extension or base of the other jaw, acting in a precisely similar way for both jaws. This guiding means secures great lateral rigidity and braces the jaws against any lateral yielding. But in addition to such extension or base 7, each jaw has a prolongation of the extension or base which extends clear across the whole diameter of the chuck, or substantially so, and these prolongations have individual guides in the chuck casing which are not common to the other jaw. These prolongations, which keep the jaw guided clear across the whole diameter of the chuck, give the jaws great longitudinal stiffness, and brace them against any longitudinal yielding. In this way the jaws are given a free movement and are permitted to clamp the work without binding on their ways. By both features in combination the jaws are given the combined features of longitudinal, inward and lateral stiffness, as first pointed out above.

In Fig. 5 each jaw has a guide rod 10′ firmly secured thereto, which guide rod is preferably carried directly through the heavier part 7 of the jaw extensions just described, projecting out a certain distance at each end. These guide rods are therefore part of the chuck jaws and are carried outward through suitable guiding holes 11ᵃ formed in the frame or casing 1ᵃ of the chuck. The location of the guiding holes or bushings in this way, separated by the greatest possible distance and made part of the solid chuck casing, obtains the greatest possible rigidity, and freedom from looseness resulting from any slight wear. Moreover, the force put on the bearings by the sliding movement of the jaws is greatly lessened by this considerable separation of these guiding bushings. In addition to being guided in this way, each jaw has an additional sliding engagement 13 on the guide rod 10′ of the other jaw, and corresponding to the lateral extension or base 7ˣ of Figs. 1, 2, 3 and 4. This sturdily resists any tendency of the respective jaws to swivel upon their guide rods. In other words, the jaw is braced laterally just as is done in another way by the form of Figs. 1 to 4.

The jaws project out for a considerable distance from the face of the chuck, as already mentioned, to the end that a sufficient depth of space may be provided between them to engage a variety of work. This condition would set up binding strains and would also cause wear, except for the comparatively long guide rods 10′, or equivalent prolongations 10 in Figs. 1, 2, 3 and 4, which control the movement of the jaws. This cross projection of the jaws is therefore a further factor related to the means for securing stiffness in the guiding of the jaws.

As a result of the construction described, the jaws will have an easy movement in their guides without being cramped or bound therein when clamped upon a piece of work. This is particularly valuable when the jaws project considerably from the surface of their support, in other words having what may be described as considerable overhang on the work, which results in a special tendency to cramp the jaws in their guides unless means are adopted to prevent this. Moreover the guides for the jaws are adapted to secure great strength and rigidity not only in a direction parallel to the movement of the jaws, but also transversely and in separate directions both inward and lateral. The feature of securing rigidity in two directions across the path of movement of the jaws, results in securing rigidity across the face of the chuck, besides in a direction inward or parallel to the axis of rotation thereof.

In the foregoing description and accompanying drawings, I have set forth my invention in the particular detailed form which I prefer to adopt as shown in Figs. 1 to 4, and which in practice has been found to answer to a satisfactory degree the ends to be attained. It will be manifest, however, to the skilled mechanic that these details may be variously modified and changed without departing from the limits of the invention, and it will be understood that the invention is not limited to any particular form or construction of the parts except in so far as such limitations are specified in the claims.

Having thus described my invention, what I claim is:

1. The combination of a chuck casing, opposing gripping jaws each provided with a lateral extension disposed opposite each other, guides on the casing common to both extensions and serving to guide said extensions each on its opposite sides, a prolongation on each extension overlapping the other extension, said prolongations being spaced from each other, guides on the casing engaging the opposite sides of each prolongation, and jaw actuating means disposed between the spaced prolongations and adapted to be operated to move said prolongations endwise and thereby actuate the jaws.

2. The combination of a chuck casing, opposing gripping jaws each provided with a lateral extension, which extensions oppose each other, and each extension being guided on opposite sides by guides on the casing common to both extensions, and prolongations on the respective extensions guided each on opposite sides by guides on the casing, the prolongation of each extension overlapping the other extension.

In testimony whereof I have affixed my signature.

EDWARD J. McCLELLAN.

Witnesses:
RUBE FRANKEL,
CHAS. T. LUTHER.